(12) United States Patent
Laflamme et al.

(10) Patent No.: US 10,988,244 B2
(45) Date of Patent: Apr. 27, 2021

(54) HELICOPTER ROTOR HUB ASSEMBLY AND HELICOPTER INCLUDING SAME

(71) Applicant: LAFLAMME AERO INC., Saint-Joseph-de-Coleraine (CA)

(72) Inventors: Enrick Laflamme, Thetford Mines (CA); André Dubois, Brownsburg-Chatam (CA)

(73) Assignee: LAFLAMME AERO INC., Saint-Joseph-de-Coleraine (CA)

( * ) Notice: Subject to any disclaimer, the term of this patent is extended or adjusted under 35 U.S.C. 154(b) by 184 days.

(21) Appl. No.: 15/972,790

(22) Filed: May 7, 2018

(65) Prior Publication Data

US 2018/0319489 A1 Nov. 8, 2018

Related U.S. Application Data

(60) Provisional application No. 62/502,140, filed on May 5, 2017.

(51) Int. Cl.
*B64C 27/43* (2006.01)
*B64C 27/48* (2006.01)

(52) U.S. Cl.
CPC .............. *B64C 27/43* (2013.01); *B64C 27/48* (2013.01)

(58) Field of Classification Search
CPC .......... B64C 27/43; B64C 27/48; B64C 27/41
See application file for complete search history.

(56) References Cited

U.S. PATENT DOCUMENTS

| 3,007,530 | A | | 11/1961 | Doman et al. |
| 3,280,918 | A | * | 10/1966 | Meijer ................... B64C 27/54 416/117 |
| 3,918,836 | A | | 11/1975 | Johnson et al. |
| 3,941,503 | A | | 3/1976 | Bruel |
| 3,942,910 | A | | 3/1976 | Snyder et al. |
| 3,967,918 | A | | 7/1976 | Mouille et al. |
| 4,012,169 | A | | 3/1977 | Mouille et al. |
| 4,131,391 | A | | 12/1978 | Robinson |
| 4,135,856 | A | | 1/1979 | McGuire |

(Continued)

FOREIGN PATENT DOCUMENTS

DE 2547126 A1 12/1981
DE 4207019 A1 6/1995

*Primary Examiner* — Christopher Verdier
*Assistant Examiner* — Sabbir Hasan
(74) *Attorney, Agent, or Firm* — Tucker Ellis LLP

(57) ABSTRACT

A helicopter rotor hub assembly for coupling a pair of helicopter blades to a helicopter mast. It includes a yoke assembly and a pitch assembly. The yoke assembly includes a central section and first and second sections extending respectively on opposite sides of the central section. Each one of the first and second sections has a pair of elongated arms defining inbetween a bearing-receiving interspace. The pitch assembly includes first and second attachment plates extending respectively along the first and second sections of the yoke assembly and first and second pitch bearing assemblies. Each attachment plate is connected to a respective one of the helicopter blades. Each pitch bearing assembly extends in the bearing-receiving interspace of a respective one of the first and second sections of the yoke assembly. Each pitch bearing assembly contacts a respective one of attachment plates to allow a pitch movement of the helicopter blades.

21 Claims, 9 Drawing Sheets

(56) References Cited

U.S. PATENT DOCUMENTS

| | | | |
|---|---|---|---|
| 4,175,622 A | 11/1979 | Summerfelt | |
| 4,182,597 A | 1/1980 | Derschmidt | |
| 4,195,967 A | 4/1980 | Weiland | |
| 4,203,709 A | 5/1980 | Watson | |
| 4,227,857 A | 10/1980 | Reyes | |
| 4,257,738 A | 3/1981 | Schwarz et al. | |
| 4,257,739 A | 3/1981 | Covington et al. | |
| 4,293,276 A | 10/1981 | Brogdon et al. | |
| 4,708,591 A | 11/1987 | Roman | |
| 4,877,375 A | 10/1989 | Desjardins | |
| 5,092,738 A | 3/1992 | Byrnes et al. | |
| 5,297,934 A | 3/1994 | Desjardins | |
| 5,913,659 A | 6/1999 | Doolin et al. | |
| 6,004,099 A | 12/1999 | Bansemir et al. | |
| 6,039,538 A | 3/2000 | Bansemir | |
| 6,050,778 A | 4/2000 | McArdle et al. | |
| 6,168,379 B1 | 1/2001 | Bauer | |
| 6,394,387 B1 | 5/2002 | Mitrovic | |
| 7,883,311 B2 | 2/2011 | Moniz et al. | |
| 8,162,607 B2 | 4/2012 | Grohmann et al. | |
| 8,845,293 B1 | 9/2014 | Lowe et al. | |
| 9,090,344 B2 | 7/2015 | Stucki | |
| 9,555,880 B2 | 1/2017 | Hunter et al. | |
| 2004/0184915 A1* | 9/2004 | Kunii ..................... | A63H 27/12 416/114 |
| 2015/0158582 A1 | 6/2015 | Buesing | |

* cited by examiner

HELICOPTER ROTOR HUB ASSEMBLY AND HELICOPTER INCLUDING SAME

CROSS-REFERENCE TO RELATED APPLICATIONS

This application claims priority under 35 USC § 119(e) of U.S. provisional patent application 62/502,140 filed on May 5, 2017, the specification of which is hereby incorporated by reference.

TECHNICAL FIELD OF THE INVENTION

The technical field generally relates to helicopter rotors. More specifically, it is directed to a helicopter rotor hub assembly for coupling a pair of helicopter blades to a helicopter mast having a mast axis. It also relates to a helicopter including the rotor hub assembly.

BACKGROUND

A helicopter main rotor comprises rotor blades and a control system that generates the lift force that supports the weight of the helicopter, and the thrust that counteracts the drag in forward flight. The main rotor is mounted on a vertical shaft, or mast, at the top of the helicopter.

Rotors are generally categorized with regards to the blade movement about the rotor itself. Rotors can typically be fully articulated, semi-rigid or rigid. Depending on the type of rotor, the blades are controlled or limited in up to three types of movements defined as pitch, lag and flap. Almost all helicopter rotors minimally allow the pitch movement. It represents a rotational movement of the blade around its longitudinal axis. The pitch rotation value can be adjusted over 360°, and it can vary between 0° and about 40° during flight. For different values of the pitch, the angle of attack of the blades will be different. Lag is defined as an angular fore and aft motion of the blade with respect to the mast. It is an optional movement, but it is frequently found on helicopters. Flap is a vertical movement of the blades and is also an optional movement. A simple rotor will allow movement of the blades as the pitch only, while more complex rotors will be fully articulated, meaning that the three types of movement of the blades are possible.

Sometimes, the deformation of the material of the blade will produce flap or pitch. Under the lift force, the blades will tend to move up and thus produce flapping. It is generally desirable to control the flap of the blades, especially to reduce the vibration transmission from the rotor hub to the fuselage and to reduce the control loads.

A helicopter rotor includes a rotor hub assembly that mechanically connects the blades to the mast and to a blade control system. To mechanically connect the helicopter blades to the mast, the rotor hub assembly includes a yoke assembly. During operation, the yoke assembly is put under high stresses that are due to the centrifugal effect that is generated during rotation of the blades. These stresses are variable during a rotation of the blades (360 degrees) due to the cyclic movements of the helicopter blades. Consequently, the yoke assembly is a critical part in the conception of the helicopter rotor. In order to be structurally efficient and resistant to fatigue, the stress distribution in the yoke assembly has to be as uniform as possible. There is thus a need for a rotor hub assembly that provides a relatively uniform stress distribution.

In view of the above, there is a need for a helicopter rotor hub assembly which would be able to overcome or at least minimize some of the above-discussed prior art concerns.

BRIEF SUMMARY

It is therefore an aim of the present invention to address the above-mentioned issues.

According to a general aspect, there is provided a helicopter rotor hub assembly for coupling a pair of helicopter blades to a helicopter mast having a mast axis. The helicopter rotor has at least two pitch links extending on opposed sides of the mast. Each one of the helicopter blades has a proximal end and a distal end with a longitudinal axis extending inbetween.

The rotor hub assembly comprises a yoke assembly that includes a central section having a mast-receiving aperture defined therein and extending along the mast axis. The central section of the yoke assembly has a central section thickness. The yoke assembly further comprises a first section and a second section extending respectively on opposite sides of the central section. The first and second sections extend substantially normal to the mast axis. Each of the first and second sections comprises a pair of spaced-apart elongated arms defining inbetween a bearing opening (or bearing-receiving interspace). The elongated arms have a section along their length thinner than the central section thickness.

The rotor hub assembly further comprises a pitch assembly. The pitch assembly comprises a first set and a second set of attachment plates extending respectively along the first and second sections of the yoke assembly. Each attachment plate has a blade connecting end connectable to the proximal end of a respective one of the helicopter blades and a pitch connecting end operatively engageable to a respective pitch link.

The pitch assembly further includes a first pitch bearing assembly and a second pitch bearing assembly. Each one of the first and second pitch bearing assemblies is located between a respective one of the first and second sets of attachment plates. Each one of the first and second pitch bearing assemblies comprises a shaft having a distal end attachable to a respective one of the first and second sections of the yoke assembly. Each one of the shafts has a proximal end located closer to the central section of the yoke assembly with the shafts extending in the bearing-receiving interspace of a respective one of the first and second sections of the yoke assembly. Each one of the pitch bearing assemblies further comprises pitch bearings rotatably mounted onto the respective one of the shafts and abutting against a respective one of the first and second sets of attachment plates to allow a pitch movement of the helicopter blades in response to a displacement of at least one of the pitch links.

According to a general aspect, there is provided a helicopter rotor hub assembly for coupling a pair of helicopter blades to a helicopter mast having a mast axis. Each one of the helicopter blades has a proximal end and a distal end with a longitudinal axis extending inbetween. The rotor hub assembly comprises: a yoke assembly and a pitch assembly. The yoke assembly comprises: a central section having a mast-receiving aperture defined therein and extending along the mast axis, the central section defining a transversal axis; and a first section and a second section extending respectively on opposite sides of the central section, the first and second sections extending radially to the mast axis, each one of the first and second sections comprising a pair of spaced-apart elongated arms defining inbetween a bearing-receiving interspace. The pitch assembly comprises: a first and a second attachment plates extending respectively along the first and second sections of the yoke assembly, each one of the attachment plates having a blade connecting end connectable to the proximal end of a respective one of the helicopter blades; and a first pitch bearing assembly and a second pitch bearing assembly, each extending in the bearing-receiving interspace of a respective one of the first and second sections of the yoke assembly, each one of the first and second pitch bearing assemblies contacting a respective one of the first and the second attachment plates to allow a pitch movement of the helicopter blades.

In an embodiment, each one of the first and second pitch bearing assemblies comprises: a shaft extending in a respective one of the bearing-receiving interspace of the first and second sections of the yoke assembly and having a distal end securable to the respective one of the first and second sections; and pitch bearings rotatably mounted onto the shaft and contacting the respective one of the first and second attachment plates, wherein the first and second pitch bearing assemblies are spaced-apart from the elongated arms and the central section of the yoke assembly. Each one of the shafts can extend along a majority of a length of the bearing-receiving interspace, and can have a proximal end located adjacent to but spaced-apart from the central section of the yoke assembly. The pitch bearings can comprise a series of stacked rigid bearings covering a majority of a length of the shaft.

In an embodiment, each one of the first and the second attachment plates comprises a pair of attachment plates, each one of the pairs of attachment plates partially encasing a respective one of the first and second pitch bearing assemblies and delimiting the respective one of the bearing-receiving interspaces. The proximal end of the blades can be sandwiched between distal ends of the attachment plates of a respective one of the pairs with a respective one of distal ends of the yoke assembly being located adjacent to the proximal end of the blades. The attachment plates of each one of the pairs can extend vertically spaced-apart from one another and can be maintained spaced-apart from one another through a plurality of mechanical fasteners extending in between. At least pairs of the mechanical fasteners can be secured at proximal and distal ends of the attachment plates and at least another pair of the mechanical fasteners can be secured at an intermediate location and can extend through the bearing-receiving interspace defined by the yoke assembly and adjacent to distal ends of the elongated arms. The attachment plates can be narrower in width than the bearing-receiving interspace.

In an embodiment, each one of the first and second attachment plates has a central longitudinal axis and each one of the first and second pitch assemblies comprises a pitch connecting end offset along the transversal axis from the central longitudinal axis of a respective one of the first and second attachment plates and operatively engageable to a respective pitch link extending along the mast axis. Each one of the first and second pitch assemblies can comprise a pitch link connector mounted to a respective one of the first and second attachment plates and extending angularly with respect to the longitudinal axis of a respective one of the helicopter blades, each one of the pitch link connectors including a respective one of the pitch connecting ends. The pitch connecting ends can be substantially aligned with the mast receiving aperture along the longitudinal axis and spaced-apart thereof along the transversal axis. Each one of the pitch link connectors can comprise a pitch link connecting bracket having: a pitch link portion extending along the longitudinal axis of the blades and including, at a proximal end, the respective one of the pitch connecting ends, and an attachment plate portion mounted to the respective one of the first and second attachment plates at a proximal end thereof and extending substantially normal to the pitch link portion.

In an embodiment, the yoke assembly comprises: a yoke plate including the central section and the spaced-apart elongated arms of the first section and the second section; and a first set and a second set of yoke connecting plates mounted to distal ends of a respective one of the elongated arms to enclose the respective one of the first and second pitch bearing assemblies in a respective one of the bearing-receiving interspaces. The yoke plate can be substantially V-shaped with the first and second sections of the yoke assembly extending upwardly from the central section and from a plane defined normally to the mast axis at an angle ranging between about 0.5° and about 4° with respect to the plane.

In an embodiment, the helicopter rotor hub assembly further comprises a flap assembly comprising a first set and second set of flap bearing assemblies mounted to the central section of the yoke assembly, and disposed along a transverse axis, substantially orthogonal to both the mast axis and the longitudinal axis of the helicopter blades, each set of flap bearing assemblies having a shaft with a proximal end connected to the mast and rotating therewith about the mast axis.

According to another general aspect, there is provided a helicopter rotor hub assembly for coupling a pair of helicopter blades to a helicopter mast having a mast axis. Each one of the helicopter blades has a proximal end and a distal end with a longitudinal axis extending inbetween. The rotor hub assembly comprises: a yoke assembly including: a central section having a mast-receiving aperture defined therein and extending along the mast axis; and a first section and a second section extending respectively on opposite sides of the central section, the first and second sections extending radially to the mast axis, each one of the first and second sections comprising a pair of spaced-apart elongated arms having a flap section, the elongated arms having a tapered profile along the flap section.

In an embodiment, the central section has a central section thickness Tc greater than a thickness of the elongated arms in the flap section. The flap section of the elongated arms can have a thickness varying between 0.2*Tc and 0.875*Tc along a length of the flap section. A length of the flap section can be longer than about 4 times the central section thickness Tc. Each one of the elongated arms can have a distal end section having a thickness substantially equal to the central section thickness Tc.

In an embodiment, the yoke assembly comprises: a yoke plate including the central section, the first section and the second section, and wherein the spaced-apart elongated arms of the respective one of the first and second sections define inbetween a bearing-receiving interspace; and a first set and a second set of yoke connecting plates mounted to the distal ends of a respective one of the elongated arms to close longitudinally the respective one of the bearing-receiving interspaces. The helicopter rotor hub assembly can further comprises a pitch assembly including: a first set and a second set of attachment plates extending respectively along the first and second sections of the yoke assembly, each one of the sets of attachment plates having a blade connecting end connectable to the proximal end of a respective one of the helicopter blades; a first pitch bearing assembly and a second pitch bearing assembly, each including: a shaft extending in a respective one of the bearing-receiving interspace of the first and second sections of the yoke assembly and having a distal end secured to the yoke connecting plate of the respective one of the first and second sections; and pitch bearings rotatably mounted onto the shaft and abutting against the respective one of the first and second sets of attachment plates.

The yoke plate can be substantially V-shaped with the first and second sections of the yoke assembly extending upwardly from the central section and from a plane defined normally to the mast axis at an angle ranging between about 0.5° and about 4° with respect to the plane.

In an embodiment, the helicopter rotor hub assembly further comprises a flap assembly comprising a first set and second set of flap bearing assemblies mounted to the central section of the yoke assembly, and disposed along a transverse axis, substantially orthogonal to both the mast axis and the longitudinal axis of the helicopter blades, each set of flap bearing assemblies having a shaft with a proximal end connected to the mast and rotating therewith about the mast axis.

According to still another general aspect, there is provided a helicopter rotor hub assembly for coupling a pair of helicopter blades to a helicopter mast having a mast axis. Each one of the helicopter blades has a proximal end and a distal end with a longitudinal axis extending inbetween. The rotor hub assembly comprises: a yoke assembly including: a central section having a mast-receiving aperture defined therein and extending along the mast axis; and a first section and a second section extending respectively on opposite sides of the central section, the first and second sections extending radially to the mast axis, each one of the first and second sections comprising a pair of spaced-apart elongated arms. The rotor hub assembly further comprises: a flap assembly comprising a first set and second set of flap bearing assemblies mounted to the central section of the yoke assembly, and disposed along a transverse axis, substantially orthogonal to both the mast axis and the longitudinal axis of the helicopter blades, each set of flap bearing assemblies having a shaft with a proximal end connected to the mast and rotating therewith about the mast axis.

In an embodiment, the elongated arms have a flap section and the central section has a central section thickness Tc, wherein the flap section of the elongated arms having a thickness varying between 0.2*Tc and 0.875*Tc along a length of the flap section, wherein a length of the flap section is longer than about 4 times the central section thickness Tc; and wherein each one of the elongated arms has a distal end section having a thickness substantially equal to the central section thickness Tc.

In an embodiment, the yoke assembly comprises: a yoke plate including the central section, the first section and the second section, and wherein the spaced-apart elongated arms of the respective one of the first and second sections define inbetween a bearing-receiving interspace; and a first set and a second set of yoke connecting plates mounted to the distal ends of a respective one of the elongated arms to close longitudinally the respective one of the bearing-receiving interspaces. The yoke plate can be substantially V-shaped with the first and second sections of the yoke assembly extending upwardly from the central section and from a plane defined normally to the mast axis at an angle ranging between about 0.5° and about 4° with respect to the plane.

In an embodiment, the helicopter rotor hub assembly further comprises a pitch assembly including: a first set and a second set of attachment plates extending respectively along the first and second sections of the yoke assembly, each one of the sets of attachment plates having a blade connecting end connectable to the proximal end of a respective one of the helicopter blades; a first pitch bearing assembly and a second pitch bearing assembly, each including: a shaft extending in a respective one of the bearing-receiving interspace of the first and second sections of the yoke assembly and having a distal end secured to the yoke connecting plate of the respective one of the first and second sections; and pitch bearings rotatably mounted onto the shaft and abutting against the respective one of the first and second sets of attachment plates.

According to a further general aspect, there is provided a helicopter rotor hub assembly for coupling a pair of helicopter blades to a helicopter mast having a mast axis. Each one of the helicopter blades has a proximal end and a distal end with a longitudinal axis extending inbetween. The rotor hub assembly comprises: a yoke assembly comprising a yoke plate including: a central section having a mast-receiving aperture defined therein and extending along the mast axis; and a first section and a second section extending respectively on opposite sides of the central section, the first and second sections extending radially to the mast axis, each one of the first and second sections comprising a pair of spaced-apart elongated arms defining inbetween a bearing-receiving interspace, wherein the yoke plate is substantially V-shaped with the first and second sections of the yoke assembly extending upwardly from the central section and from a plane defined normally to the mast axis at an angle ranging between about 0.5° and about 4° with respect to the plane.

In an embodiment, the elongated arms have a flap section and the central section has a central section thickness Tc, wherein the flap section of the elongated arms having a thickness varying between 0.2*Tc and 0.875*Tc along a length of the flap section, wherein a length of the flap section is longer than about 4 times the central section thickness Tc; and wherein each one of the elongated arms has a distal end section having a thickness substantially equal to the central section thickness Tc.

In an embodiment, the helicopter rotor hub assembly further comprises a flap assembly comprising a first set and second set of flap bearing assemblies mounted to the central section of the yoke assembly, and disposed along a transverse axis, substantially orthogonal to both the mast axis and the longitudinal axis of the helicopter blades, each set of flap bearing assemblies having a shaft with a proximal end connected to the mast and rotating therewith about the mast axis In an embodiment, the helicopter rotor hub assembly further comprise a pitch assembly comprising: a first set and a second set of attachment plates extending respectively along the first and second sections of the yoke assembly, each one of the sets of attachment plates having a blade connecting end connectable to the proximal end of a respective one of the helicopter blades; a first pitch bearing assembly and a second pitch bearing assembly, each including: a shaft extending in a respective one of the bearing-receiving interspace of the first and second sections of the yoke assembly and having a distal end secured to the yoke connecting plate of the respective one of the first and second sections; and pitch bearings rotatably mounted onto the shaft and abutting against the respective one of the first and second sets of attachment plates.

According to still a further general aspect, there is provided a helicopter comprising the helicopter rotor hub assembly as described hereinabove.

BRIEF DESCRIPTION OF THE DRAWINGS

It will be noted that throughout the appended drawings, like features are identified by like reference numerals.

DETAILED DESCRIPTION

Figure 1:
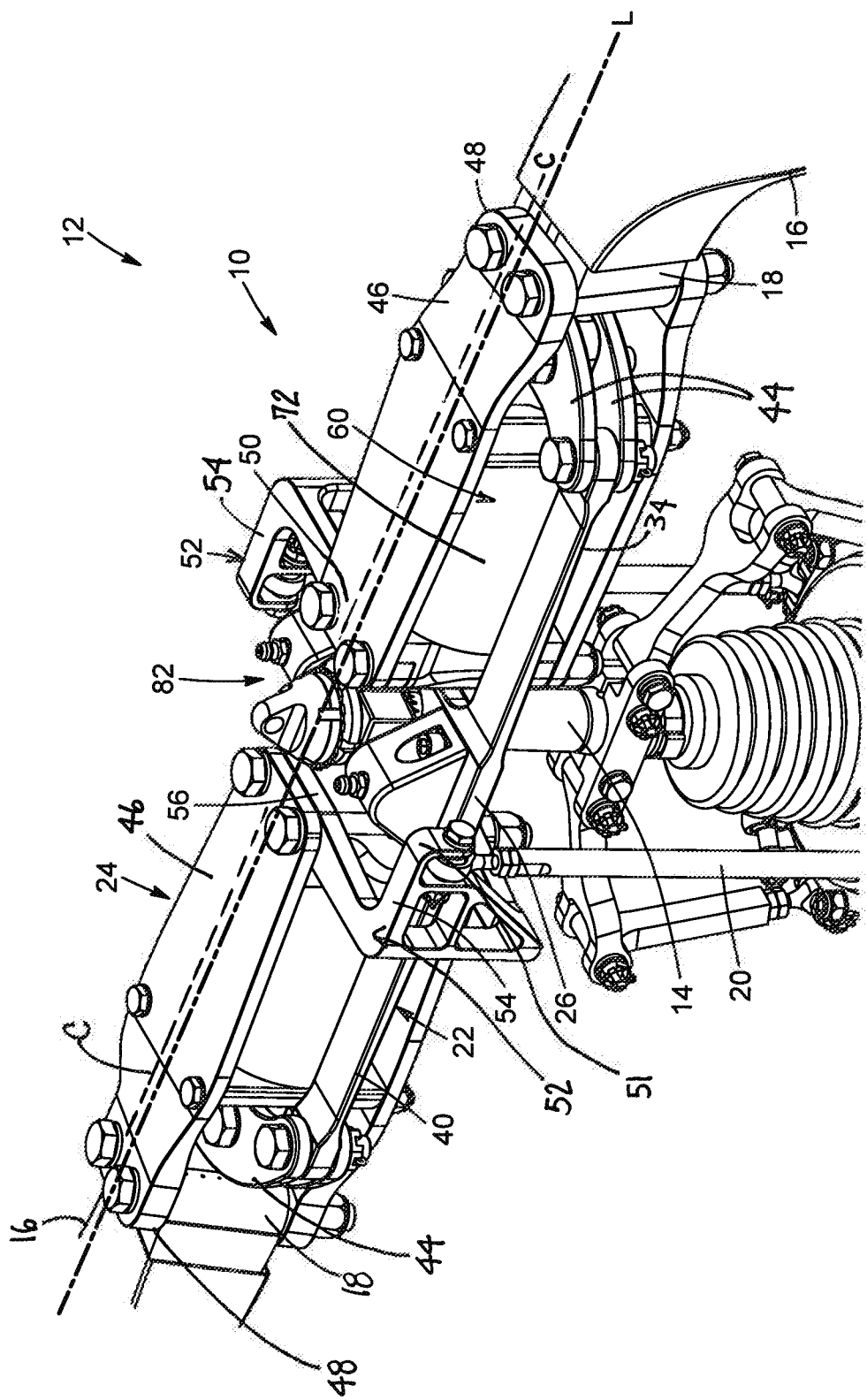
FIG. 1 is a perspective view of a helicopter rotor hub assembly, within its environment consisting of a pair of helicopter blades, a pair of pitch links, a helicopter mast and a control system, according to an embodiment.

In the following description, the same numerical references refer to similar elements. Furthermore, for the sake of simplicity and clarity, namely so as to not unduly burden the figures with several reference numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Although the embodiments of a helicopter rotor hub assembly and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation therein between, as well as other suitable geometrical configurations, may be used for the helicopter rotor hub assembly, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

It will be appreciated that positional descriptions such as "distal" and "proximal" should, unless otherwise indicated, be taken in the context of the figures and correspond to the position with respect to a helicopter mast, with the position "proximal" corresponding to a position closer to the helicopter mast and the position "distal" corresponding to a position further away from the helicopter mast. Positional descriptions should not be considered limiting.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

The embodiments, geometrical configurations, materials mentioned and/or dimensions shown in the figures are optional, and are given for exemplification purposes only.

With reference to FIG. 1, a rotor hub assembly 10 within its environment is shown according to an embodiment. A rotor comprising a rotor hub such as the one described below can possibly be used on a helicopter having a single rotor or a pair of rotors. In the following description, the rotor hub assembly 10 will be described in reference to a helicopter main rotor. However, it is appreciated that the rotor hub assembly 10 can be applied to other rotors, such as and without being limitative gyrocopter rotors, tiltrotor rotor, or other types of aircraft equipped with a rotor.

A helicopter main rotor includes rotatably mounted helicopter blades and a control system operatively connected to the helicopter blades to control same. In the embodiment shown, the main rotor 12 is mounted to a rotatable mast 14. In an embodiment, the rotatable mast 14 can protrude from a top of a cabin of the helicopter. The mast 14 extends along a mast axis M (see FIG. 4). In the embodiment shown on FIGS. 1 and 5, the rotor 12 includes two elongated blades 16. Each helicopter blade 16 has a proximal end 18 and a distal end (not shown) with a longitudinal axis L extending inbetween. The control system of the rotor 12 also includes two pitch links 20 to initiate a pitch movement of the blades 16, as will be described in more details below. Each one of the two pitch links 20 extends substantially vertically and substantially parallel to the mast axis M on opposed sides of the mast 14. The flap movement of the blades 16 is controlled through a particular configuration of the parts of the helicopter rotor hub assembly 10 that is described hereinafter.

Thus, the rotor 12 includes the helicopter rotor hub assembly 10 to operatively connect the helicopter blades 16 to the helicopter mast 14 and to the control system including the pitch links 20. Amongst others, the rotor hub assembly 10 includes a yoke assembly 22 and a pitch assembly 24 to allow a flap movement of the blades 16 as well as a pitch movement of the blades 16.

Figure 8:
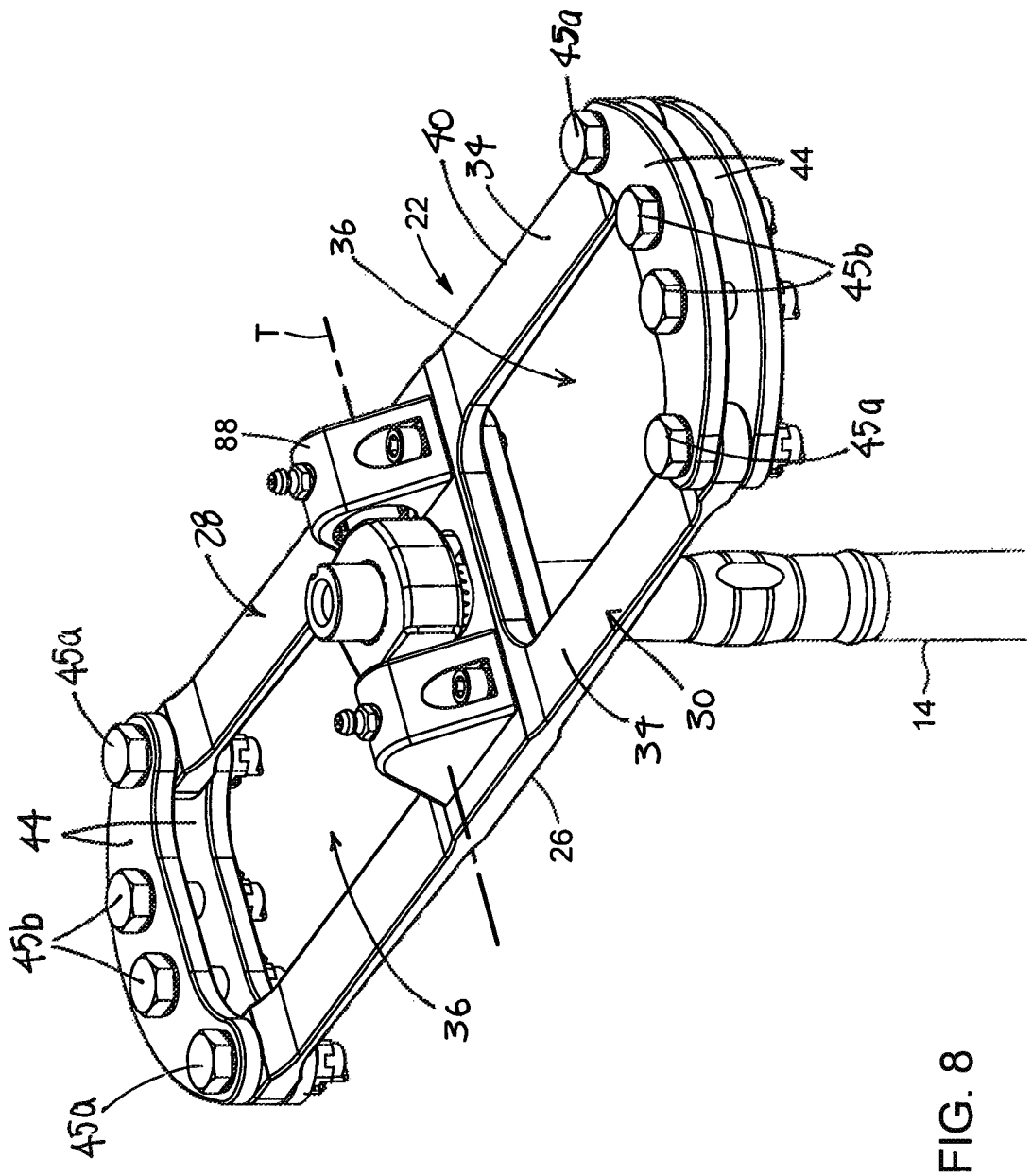
FIG. 8 is a perspective view of a yoke assembly and of a flap assembly mounted to the mast of the helicopter rotor hub assembly of FIG. 1.
Figure 9:
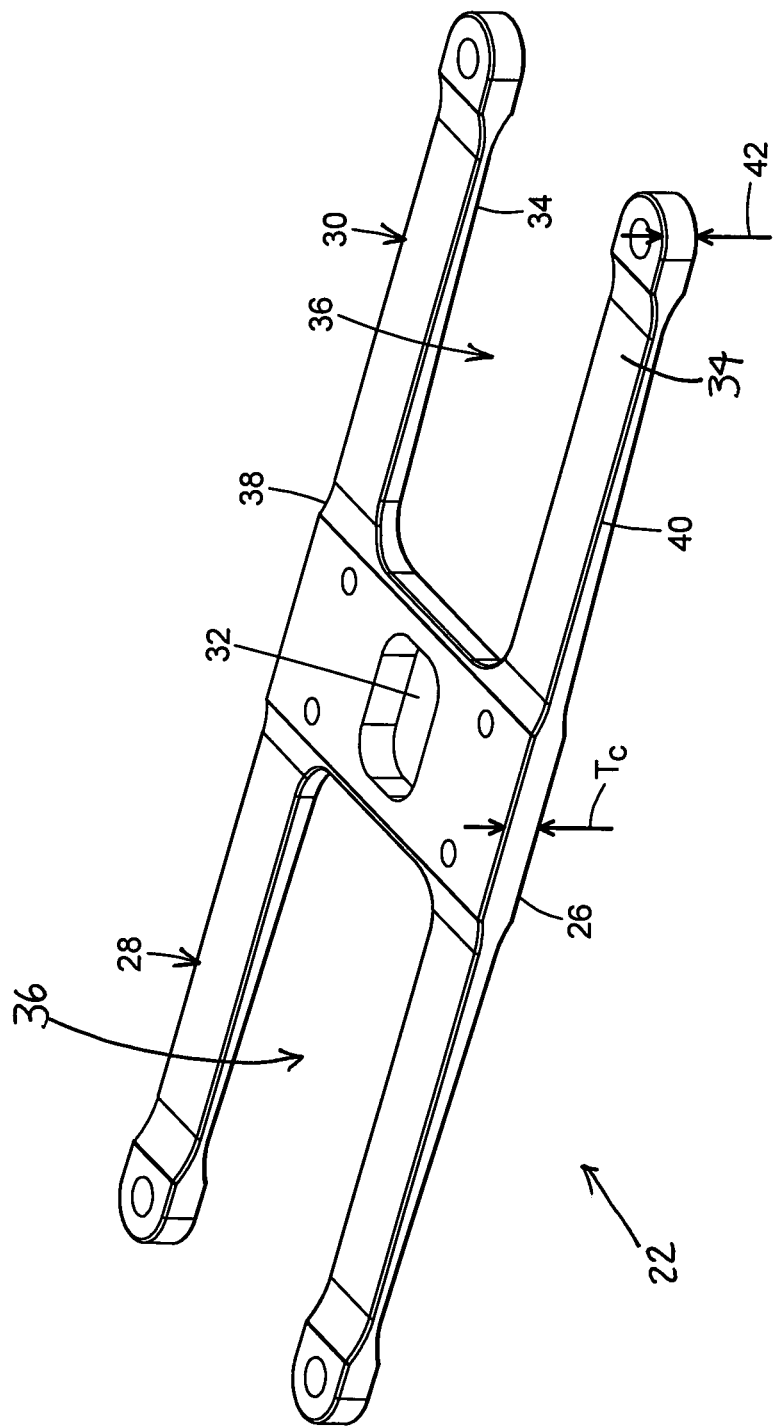
FIG. 9 is a perspective view of the yoke assembly of the helicopter rotor hub assembly of FIG. 1.

As shown on FIGS. 8 and 9, the yoke assembly 22 includes a central section 26 and a first section 28 and a second section 30 that extend respectively on opposite sides of the central section 26, i.e. they are diametrically opposed. The central section 26 has a mast-receiving aperture 32 defined therein and defines a transversal axis T (FIG. 8). The mast-receiving aperture 32 extends along the mast axis M and is configured to receive the mast 14 therein. The mast 14 extends through the mast-receiving aperture 32 without being in direct physical contact therewith. The mast 14 and the yoke assembly 22 rotate simultaneously without the mast 14 directly engaging the yoke assembly 22 in rotation, as will be described in more details below. In the embodiment shown, a diameter of the mast-receiving aperture 32 is larger than a diameter of the mast 14. It is appreciated that the shape and the configuration of the yoke assembly, the first and second sections, and the mast-receiving aperture can vary from the embodiment shown.

In the embodiment shown, the rotor 12 includes two diametrically opposed blades 16. However, it is appreciated that, in an alternative embodiment, the rotor can include more than two blades. In such embodiment, it is appreciated that the yoke assembly can include more than two sections.

Each one of the first and second sections 28, 30 extends substantially radially to the mast axis M, i.e. they extend from a central axis, which corresponds to the mast axis M. In the embodiment shown, each one of the first and second sections 28, 30 include a pair of spaced-apart elongated arms 34 defining inbetween a bearing-receiving interspace 36.

In the embodiment shown, the yoke assembly 22 includes a single piece H-shaped yoke plate 38 including the central section 26 and the elongated arms 34 of the first and second sections 28, 30 protruding outwardly from the central section 26. It is however appreciated that the shape and configuration can vary from the embodiment shown.

During flight, a vertical lift force is generated by the rotation of the blades of the helicopter, and a centrifugal load is applied on the blades and on the yoke assembly that connects the helicopter blades to the mast. The combination of the lift force and the centrifugal load cause the blades to deflect upwardly, i.e. the blades extend at an angle from a plane defined normally to the mast and form a cone shape. This angle is defined as the coning angle. In order to reduce the stresses in the yoke assembly, the yoke assembly may have portions extending at a pre-coning angle with respect to the plane extending normally to the mast. In other words, these portions will enable the blades to extend at an angle, with respect to a plane extending normal to the mast axis, even when not in flight.

In the embodiment shown, the yoke assembly 22 acts as a mechanism to support indirectly the helicopter blades 16 elevated from a horizontal plane at a pre-coning angle, i.e. the yoke assembly 22 and, more particularly, the H-shaped plate 38 is not flat and defines a pre-coning angle deflection. More specifically, in a possible embodiment, the yoke assembly comprises a central section 26 and a first section 28 and a second section 30 extending upwardly from the central section 26 and from a plane defined normally to the mast axis at a pre-coning angle ranging between about 0.5° and about 4° with respect to the plane. The yoke assembly 22 is therefore substantially V-shaped and supports the blades 16 elevated from the plane extending normally to the mast.

The central section 26 of the yoke assembly 22 has a central section thickness Tc to provide sufficient structural properties. As shown in FIGS. 1, 3, 8, and 9, each one of the elongated arms 34 can be divided along their length in a flap section 40 extending from the central section 26 and a distal end section 42. The flap section 40 is thinner along its length than the thickness of the central section 26 of the yoke assembly 22. In the embodiment shown, the flap section 40 extends along a majority of a length of each one of the elongated arms 34. In the embodiment shown, the flap sections 40 of the elongated arms 34 are tapered, being thicker adjacent to the central section 26 until a distal end thereof, adjacent to the distal end section 42 of the elongated arms 34. Thus, in the embodiment shown, the flap sections 40 have a variable thickness along their length, being thicker adjacent to the central section 26 and thinner at the distal end thereof. Each one of the elongated arms 34 ends with the distal section 42 which, in the embodiment shown, is thicker than the flap section 40. In the embodiment shown, the thickness of the distal section 42 substantially corresponds to the central section thickness Tc.

The thickness Tc of the central section 26 has a minimum thickness which is determined by the required structural properties for mechanical attachment of the flap assembly 82, amongst others. The first and second sections 28, 30 of the yoke assembly 22 have flap sections 40 characterized by a thickness varying between 0.2×Tc to 0.875×Tc. The length of the flap sections 40 has a minimum of 4×Tc. In an embodiment, a thickness ratio between the central section thickness Tc and the thickness of the flap sections 40 ranging between about 1.3 and about 5 and, in another embodiment, between about 1.5 and about 3, allows acceptable structural properties and the necessary flexibility for the flap motion of the blades 16, as will be described in more details below.

Referring now to FIG. 8, in the embodiment shown, the yoke assembly 22 also includes arc-shaped yoke connecting plates 44 secured to the distal ends of the elongated arms 34 and delimiting longitudinally the bearing-receiving interspace 36. More particularly, a pair of spaced-apart arc-shaped yoke connecting plates 44 is secured to each one of the first and second sections 28, 30 with a first one of the plates 44 being secured above the elongated arms 34 and a second one of the plates 44 being secured under the elongated arms 34. In the embodiment shown, the plates 44 are secured to the elongated arms 34 at their ends through mechanical fasteners 45a. The plates 44 are also connected to one another through mechanical fasteners 45b, located between their respective ends and between the mechanical fasteners 45a. In the non-limitative embodiment shown, the mechanical fasteners 45a, 45b are embodied by bolts. It is appreciated that, in alternative embodiments (not shown), the shape, the number and the configuration of the plates 44 and the mechanical fasteners 45a, 45b can vary from the embodiment shown. Furthermore, the plates 44 could be single-piece with the central, first and second sections 26, 28, 30 of the yoke assembly 22. It is also appreciated that, in an alternative embodiment, the plates 44 can be welded to the H-shaped plate 38. It is also appreciated that the shape and the configuration of the yoke connecting plates 44 can vary from the embodiment shown.

Figure 2:
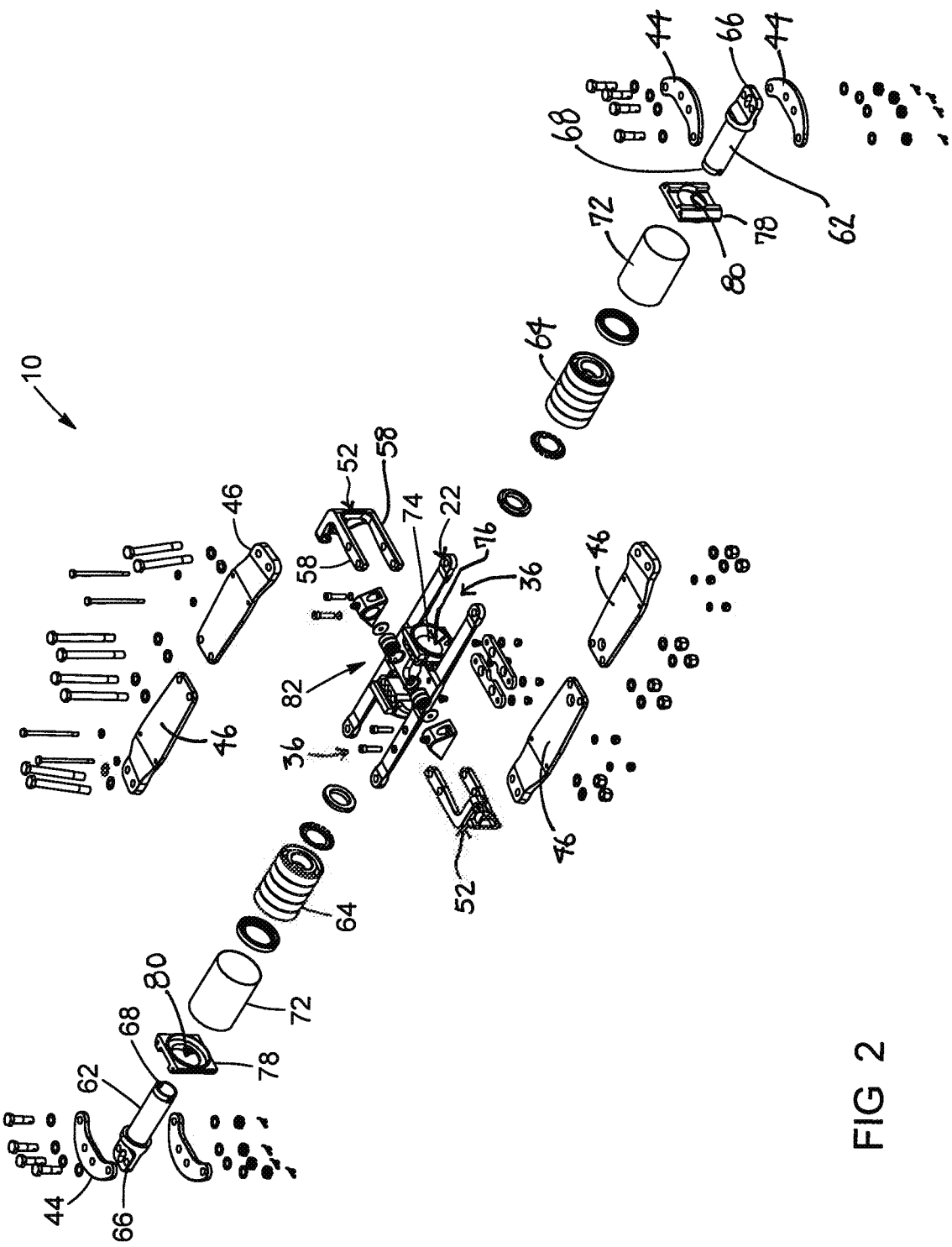
FIG. 2 is an exploded view of the helicopter rotor hub assembly according to the embodiment of FIG. 1.
Figure 3:
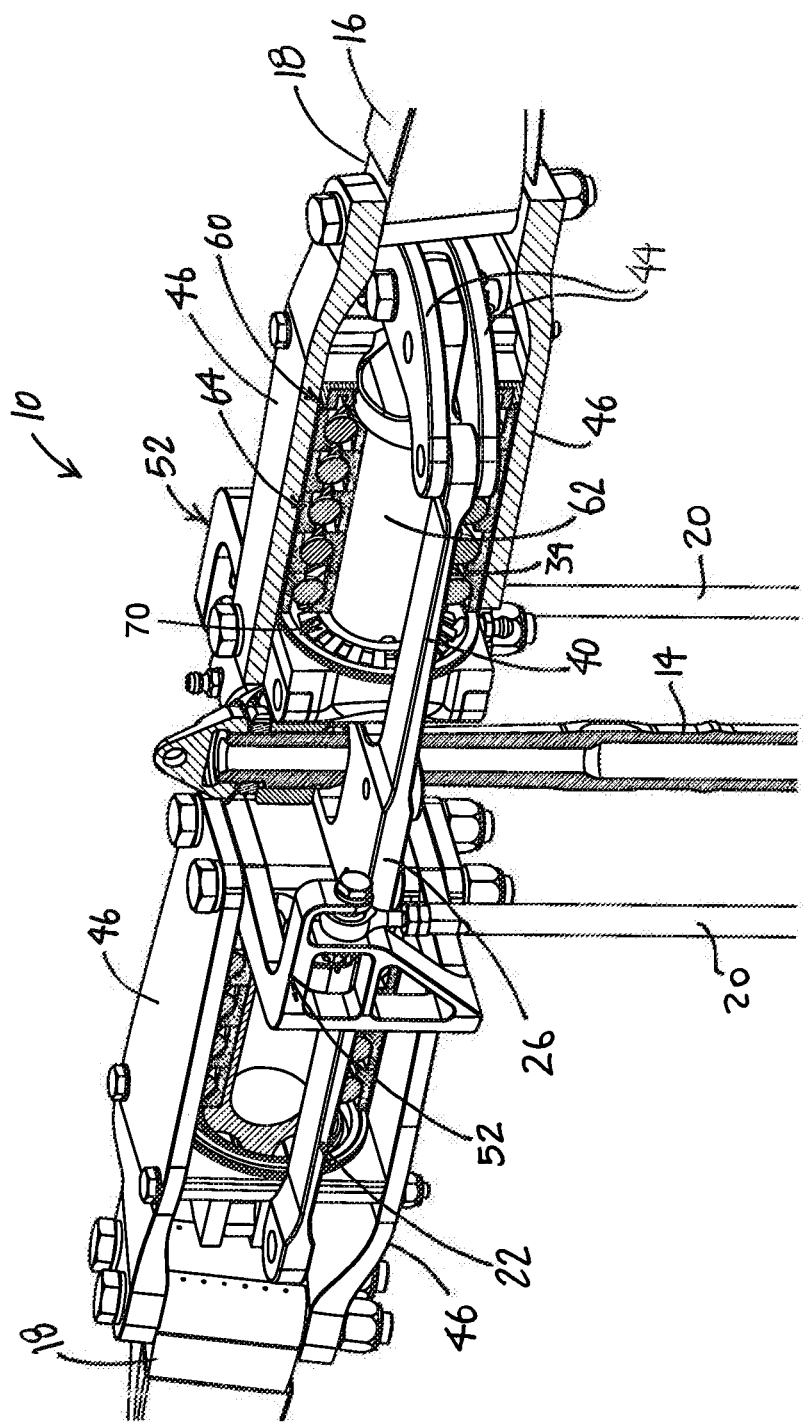
FIG. 3 is a perspective view, partly sectioned, of the helicopter rotor hub assembly of FIG. 1, with the control system partially removed.

Referring back to FIGS. 1 to 3, there is shown that the pitch assembly 24 of the helicopter rotor hub assembly 10 is configured to mechanically connect and support the helicopter blades 16. In the embodiment shown, it includes a first set and a second set of attachment plates 46 extending respectively along the first and second sections 28, 30 of the yoke assembly 22. A first one of the attachment plates of each set 46 extends above the first and second sections 28, 30 of the yoke assembly 22 while a second one of the attachment plates of each set 46 extends below the first and second sections 28, 30 of the yoke assembly 22. Each one of the plates 46 further delimits the bearing-receiving interspace 36, as will be described in more details below. Each attachment plate 46 has a blade connecting end 48 (i.e. distal end) and a proximal end 50, opposed to the blade connecting end 48, as shown on FIG. 1. The blade connecting end 48 of each attachment plate is connectable to the proximal end 18 of a helicopter blade 16 and extends longitudinally past the plates 44 of the yoke assembly 22, i.e. further away from the mast receiving aperture 32. According to an embodiment as shown on FIGS. 1 and 2, the helicopter blade 16 is attached to a respective one of the sets of attachment plates 46 using mechanical fasteners, such as and without being limitative bolts, that connects the two blade connecting ends 48 of the two attachment plates 46 of a set together with the proximal end 18 of the helicopter blade 16 extending inbetween. Thus, the mechanical fasteners extend through the two attachment plates 46 of a set and the helicopter blade 16 to connect same together.

In the embodiment shown, the two attachment plates 46 of a set extend substantially parallel to one another along the bearing-receiving interspace 36 and towards one another for the section extending outwardly past the bearing-receiving interspace 36, i.e. from a section substantially aligned with the respective ones of the plates 44.

It is appreciated that, in an alternative embodiment (not shown), the pitch assembly 24 could include only two attachment plates, each one extending along a respective one of the first and second sections of the yoke assembly 22 and being diametrically opposed.

In the embodiment shown, the proximal ends 18 of the blades 16 is sandwiched between distal ends 48 of the attachment plates 46 of a respective one of the sets with a respective one of distal ends of the yoke assembly 22 being located adjacent to the proximal end 18 of the blades 16. Thus, the distal ends of the yoke assembly 22 are located proximal, i.e. closer to the mast-receiving aperture 32, than the connection between the distal ends 48 of the attachment plates 46 and the proximal ends 18 of the blades 16.

In the embodiment shown, the attachment plates 46 of each one of the sets extend vertically spaced-apart from one another and are maintained spaced-apart from one another through a plurality of mechanical fasteners extending in between. In the embodiment shown, the mechanical fasteners are embodied by bolts but it is appreciated that other types of mechanical fasteners or spacers can be used. In the embodiment shown, at least pairs of the mechanical fasteners are secured at proximal and distal ends 50, 48 of the attachment plates 46 and at least another pair of the mechanical fasteners is secured at an intermediate location (i.e. between the proximal and distal ends 50, 48 of the attachment plates 46) and extends through the bearing-receiving interspace 36 defined by the yoke assembly 22. In the embodiment shown, the intermediate pair of mechanical fasteners are located adjacent to distal ends of the elongated arms 34, spaced-apart from one another along the transversal axis T.

In the embodiment shown, the attachment plates 46 are slightly narrower in width, i.e. along the transversal axis T, than the bearing-receiving interspace 36, and substantially cover the bearing-receiving interspace 36.

Each one of the attachment plates 46 has a central longitudinal axis C, extending substantially parallel to the longitudinal axis L, and centrally in the attachment plate 46, radially from the mast-receiving aperture 32. Each one of the pitch assemblies 24 has a pitch connecting end 51 which is transversally offset from the central longitudinal axis C of the respective one of the sets of attachment plates 46. The attachment plates 46 are operatively connected to a respective pitch link 20 through the pitch connecting end 51 of the pitch assembly 24.

In the embodiment shown, the pitch assembly 24 also includes a first and a second pitch link connecting brackets 52, acting as pitch link connectors. More particularly, each one of the first and a second pitch link connecting brackets 52 connects a respective one of the sets of attachment plates 46 to a respective one of the pitch links 20. In the embodiment shown, each pitch link connecting bracket 52 is substantially L-shaped, in profile (or top plan view), with a pitch link portion 54 extending substantially along the longitudinal axis L of the blades 16 and an attachment plate portion 56 extending substantially normal to the pitch link portion 54 and to the longitudinal axis L. The attachment plate portion 56 of the brackets 52 is mounted to the respective one of the first and second attachment plates 46 at the proximal end 50 thereof.

A respective one of the pitch links 20 of the helicopter has an upper end secured to a respective one of the pitch link portions 54 at the pitch connecting end 51 and is configured to selectively raise and lower the respective pitch link portions 54 of the corresponding set of attachment plates 46. In the embodiment shown, the pitch connecting end 51 is located at a proximal end of the pitch link portion 54. The attachment plate portions 56 of the brackets 52 include two vertically spaced-apart arms 58, each one being secured through mechanical fasteners, such as and without being limitative bolts, to the proximal end 50 of a respective one of the attachment plates 46 of one of the sets. More particularly, the mechanical fasteners extend through the two attachment plates 46 of one the sets and the arms 58 of one of the pitch link connecting brackets 52 to secure same together. In the embodiment shown, the arms 58 of the pitch link connecting brackets 52 are located between the two attachment plates 46 of the corresponding set.

Thus, sequentially through the pitch link connecting brackets 52 and the attachment plates 46, a vertical translation of the pitch links 20 imparts a rotation movement to the helicopter blades 16 about their longitudinal axis L. In the embodiment shown, through the L-shaped profile of the pitch link connecting brackets 52, the pitch connecting ends 51 are substantially aligned with the mast axis M along the transversal axis T, extending normal to the longitudinal axis L of the blades 16. Thus, the two pitch connecting ends 51 are diametrically opposed with respect to the mast axis M.

In an alternative embodiment, it is appreciated that the shape and configuration of the pitch link connectors, including a respective one of the pitch connecting ends and mounted to a respective one of the first and second attachment plates 46, can vary from the embodiment shown. In an embodiment, the pitch link connectors extend angularly with respect to the longitudinal axis L of a respective one of the helicopter blades 16 to be transversally offset from the central longitudinal axis C of the respective one of the sets of attachment plates 46.

To enable the rotation of the blades 16 about their longitudinal axis L, which is referred to as the pitch movement, the pitch assembly 24 further includes a pitch bearing assembly 60 for each helicopter blade 16. As shown on FIGS. 3 and 4, each pitch bearing assembly 60 is located between a respective set of attachment plates 46. The pitch bearing assemblies 60 contact a respective one of the sets of attachment plates 46 and are spaced-apart from the elongated arms 32 and the central section 26 of the yoke assembly 22.

Figure 4:
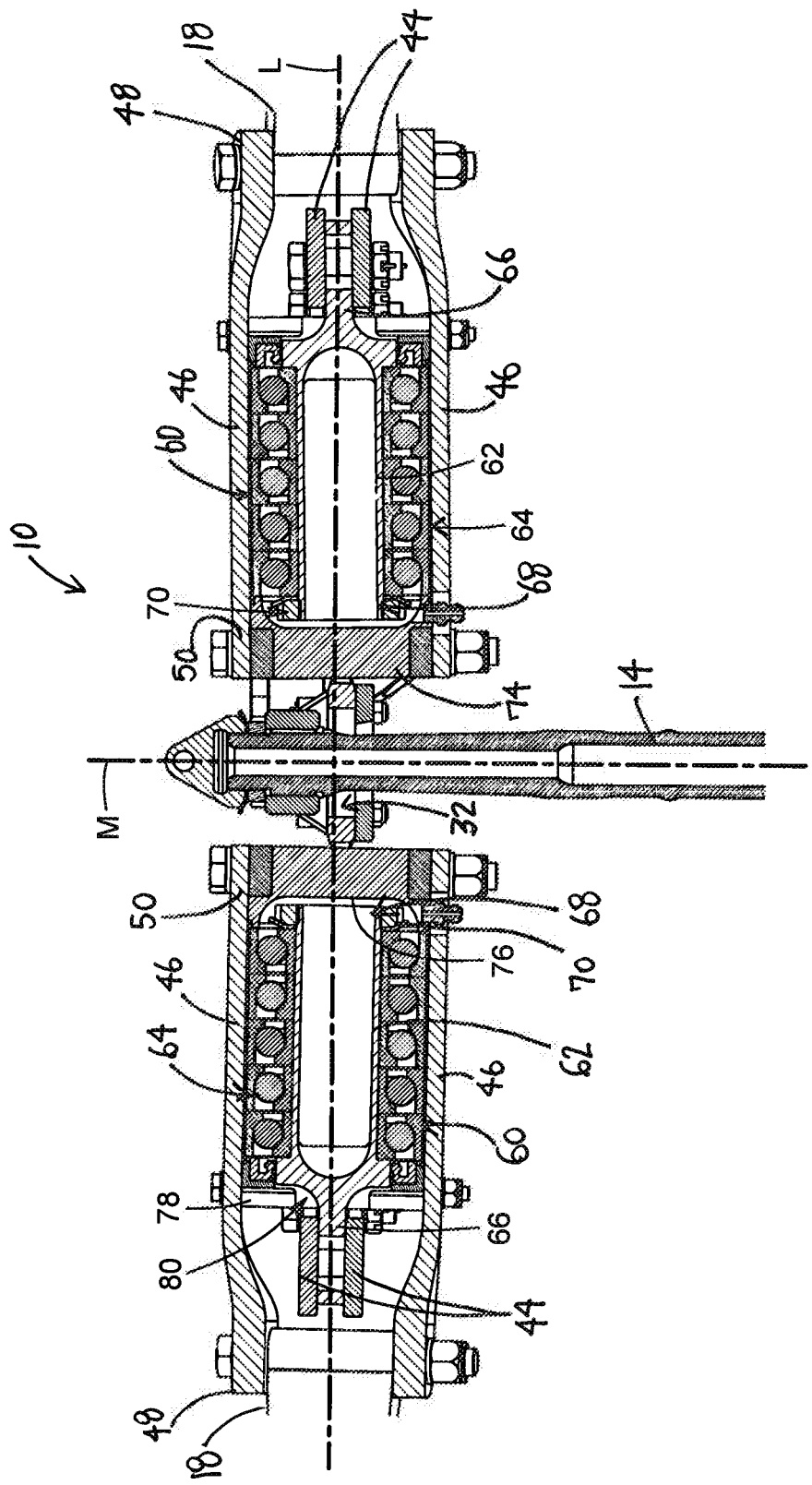
FIG. 4 is a cross-section view of the helicopter rotor hub assembly of FIG. 3, with the pitch links removed, showing a configuration of pitch bearings within sets of pitch bearing assemblies.
Figure 5:
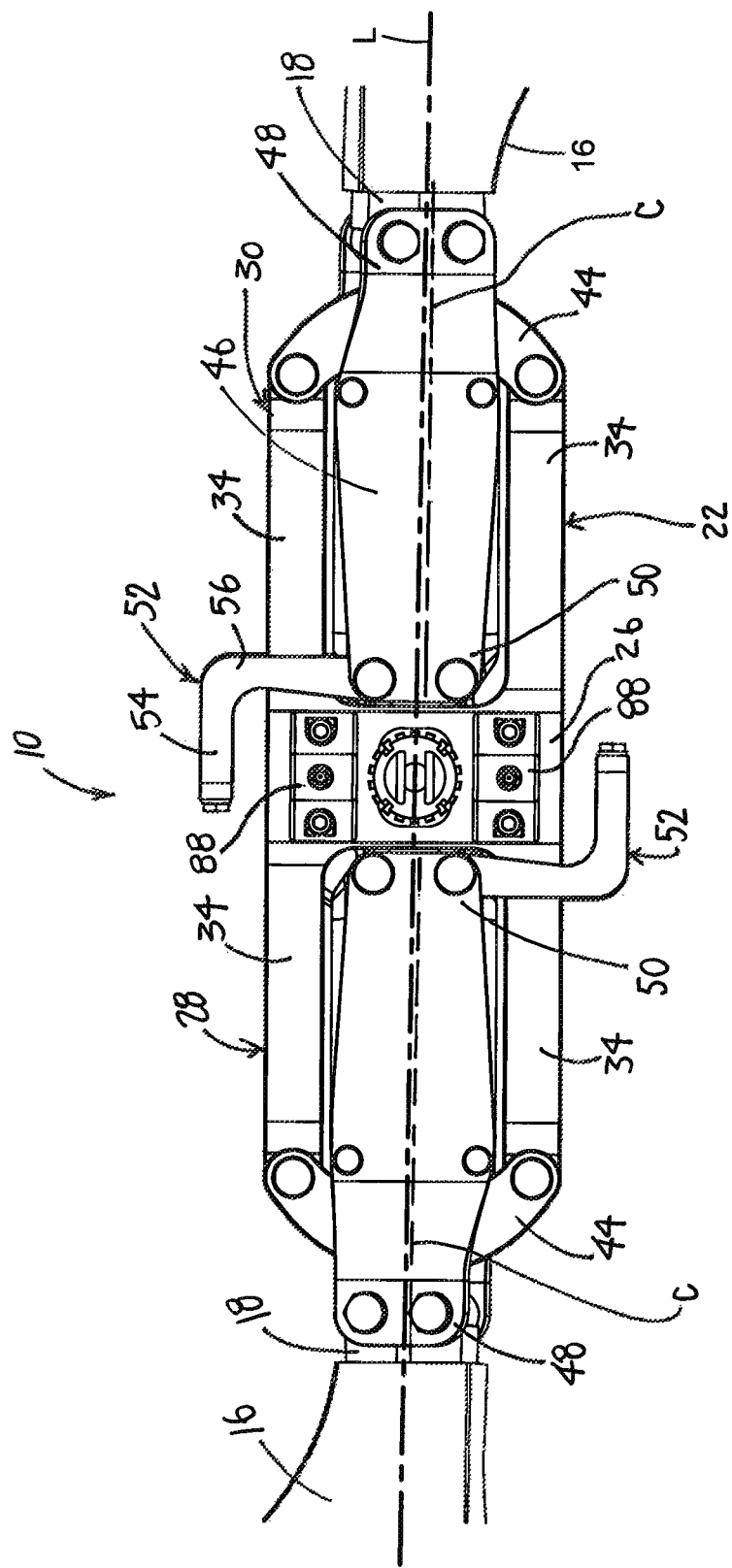
FIG. 5 is a top plan view of the helicopter rotor hub assembly of FIG. 1.

Each one of the pitch bearing assemblies 60 includes a shaft 62 and a series of pitch bearings 64 rotatably mounted onto the shaft 62. Each one of the shafts 62 extends in a respective one of the bearing-receiving interspaces 36 of a corresponding one of the first and second sections 28, 30 of the yoke assembly 22. The shaft 62 has a distal end 66 secured to a respective one of the first and the second sections 28, 30 of the yoke assembly 22. More particularly, in the embodiment shown, the distal end 66 of the shafts 62 is secured to the yoke connecting plates 44 of the yoke assembly 22. More particularly, the distal end 66 of the shafts 62 is substantially flat in shape and sandwiched between the two yoke connecting plates 44 of a pair, as shown in FIG. 4. More particularly, in the embodiment shown, the distal end 66 of the shafts 62 is secured to the connecting plates 44 through a mechanical fastener extending through aligned apertures defined in both connecting plates 44 and the distal end 66 of the shaft 62. The shafts 62 of the pitch bearing assemblies 60 also have a proximal end 68, located closer to the central section 26 of the yoke assembly 22. Each one of the pitch bearing assemblies 60 also includes a proximal pitch bearing abutment 70 of a larger diameter than that of the shaft 62 and mounted to the proximal end 68 thereof, as will be described in more details below.

In the embodiment shown in FIG. 4, the shaft 62 is represented as having an empty core. However, it is appreciated that, in an alternative embodiment (not shown), the shaft is solid.

In an embodiment, the shafts 62 extend along a majority of a length of the bearings-receiving interspaces 36, i.e. along the longitudinal axis L of the blades 16. The central axes of the shafts 62 are aligned with the rotation axis of the respective one of the helicopter blades 16.

Each one of the series of pitch bearings 64 includes stacked bearings to efficiently transfer the loads from the blades 16. The bearings can be for example and without being limitative, rigid ball bearings. In a possible embodiment, the pitch bearings 64 are of the elastomeric type. In an embodiment, the series of pitch bearings 64 covers a majority of the length of their respective shaft 62. The configuration of the pitch bearings 64 over a majority of the length of the shaft 62 along the bearings-receiving interspaces 36 and the longitudinal axis L of the blades 16 promotes the distribution of the lead and lag and tension loads from the blades 16 to the pitch bearings 64.

The pitch bearings 64 are rotatably mounted onto their shaft 62 and abut against (or contact) a respective one of the sets of attachment plates 46, through a housing thereof (if any), to allow a pitch movement of the helicopter blades 16 in response to a displacement of at least one of the pitch links 20. In other words, the pitch bearings 64 provide support to the attachment plates 46 and the blades 16 during rotation thereof.

Each set of pitch bearings 64 is maintained in place onto the shaft 62 at the shaft distal end 66 against a flange of the shaft 62 and at the shaft proximal end 68 with the proximal pitch bearing abutment 70. In the embodiment shown, the proximal pitch bearing abutment 70 includes a lock washer and a lock nut mounted to the shaft 62 to prevent longitudinal displacement of the pitch bearings 64 along the shaft 62 when the rotor is not in operation, i.e. in rotation.

In the embodiment shown, the pitch bearing assemblies 60 also include a bearing housing 72. Each one of the bearing housing 72 defines a cavity in which a respective one of the sets of pitch bearings 64 and a section of the shaft 62 at least partially surrounded by the pitch bearings 64 are contained. The bearing housings 72 protect the pitch bearings 64 and contact the attachment plates 46 of a respective one of the sets.

Figure 7:
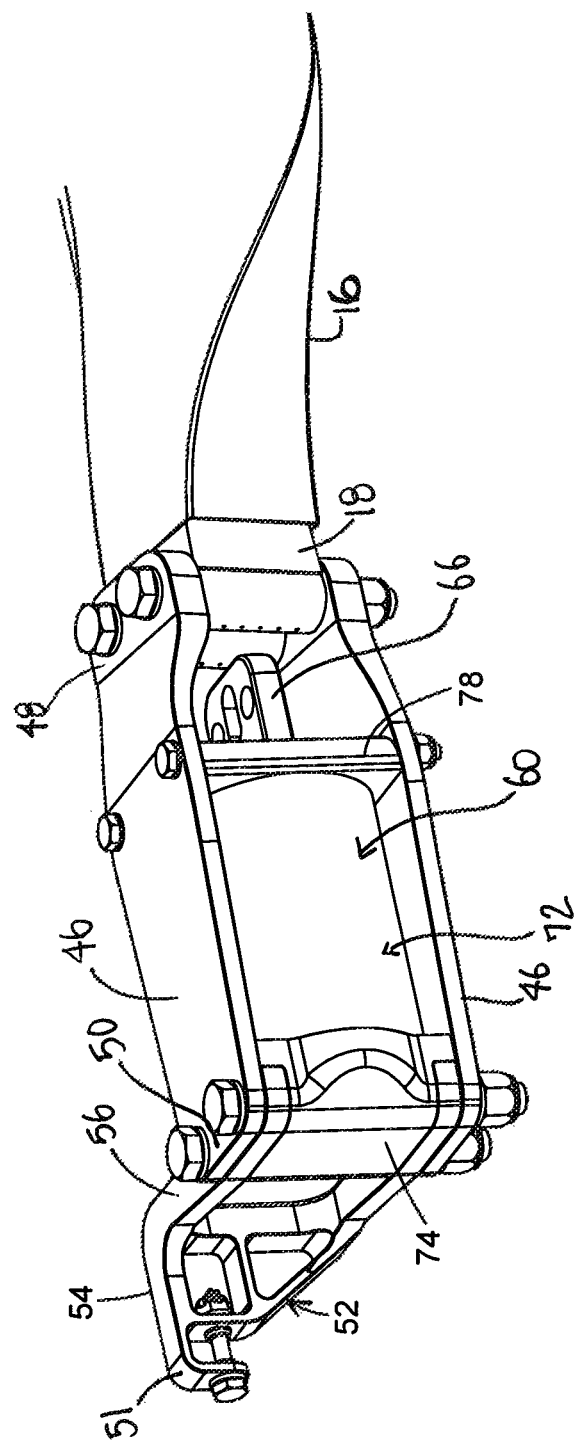
FIG. 7 is a perspective view of a pitch assembly of the helicopter rotor hub assembly of FIG. 1, with a portion of a helicopter blade.

Referring now to FIG. 7, there is shown that, in the embodiment described, each pitch bearing assembly 60 further includes a proximal pitch plate 74, extending between the attachment plates 46 of a corresponding one of the sets, at the proximal end 50 thereof. More particularly, the proximal pitch plates 74 are secured to the attachment plates 46 through the mechanical fasteners securing the attachment plate portions 56 of the brackets 52 to the attachment plates 46. Thus, the mechanical fasteners extend through the assembly including the attachment plates 46, the arms of the attachment plate portions 56 of the brackets 52 (located between the two spaced-apart attachment plates 46), and the proximal pitch plate 74 (sandwiched between the two spaced-apart arms of the attachment plate portions 56).

On its distal face, i.e. the face facing away from the mast receiving aperture 32, each one of the proximal pitch plates 74 has a central cavity 76 (FIG. 2) defined therein to receive the proximal end 68 of the shaft 62. However, as shown in FIG. 4, the proximal ends 68 of the shafts 62 do not contact the proximal pitch plates 74, but are spaced-apart thereof.

Each of the pitch bearing assembly 60 further includes a distal pitch plate 78, provided close to a distal end thereof, and having a central aperture 80 defined therein. The distal pitch plate 78 extends between the attachment plates 46 of a corresponding one of the sets, at the distal end thereof. More particularly, the distal pitch plates 78 are secured to the attachment plates 46 through mechanical fasteners. A distal end 66 of the shafts 62 extend through the central aperture 80 to be fastened onto the yoke assembly 22 as shown on FIG. 4 and described above.

Upon the movement, such as a translation, of one of the pitch links 20 vertically along an axis substantially parallel to the mast axis M from a command of the control system of the helicopter, the corresponding bracket 52 reacts to the pitch link 20 movement and drives into movement the corresponding pitch bearing assembly 60. More particularly, translation of one of the pitch links 20 is converted into a rotation of the corresponding set of attachment plates 46 about the corresponding one of the shafts 62 through the corresponding bracket 52. Since the attachment plates 46 of the sets are secured together through the proximal pitch plates 74, the proximal pitch plates 74 rotate simultaneously with the attachment plates 46. The pitch bearings 64 mounted to the shafts 62 support the attachment plates 46 during rotation thereof. Since the helicopter blades 16 are secured to the distal end of the attachment plates 46, the helicopter blades 16 rotate simultaneously with their respective attachment plates 46 about their longitudinal axis L, which is aligned with the respective axis of the shafts 62, and thus allow the pitch movement of the corresponding helicopter blade 16.

Figure 6:
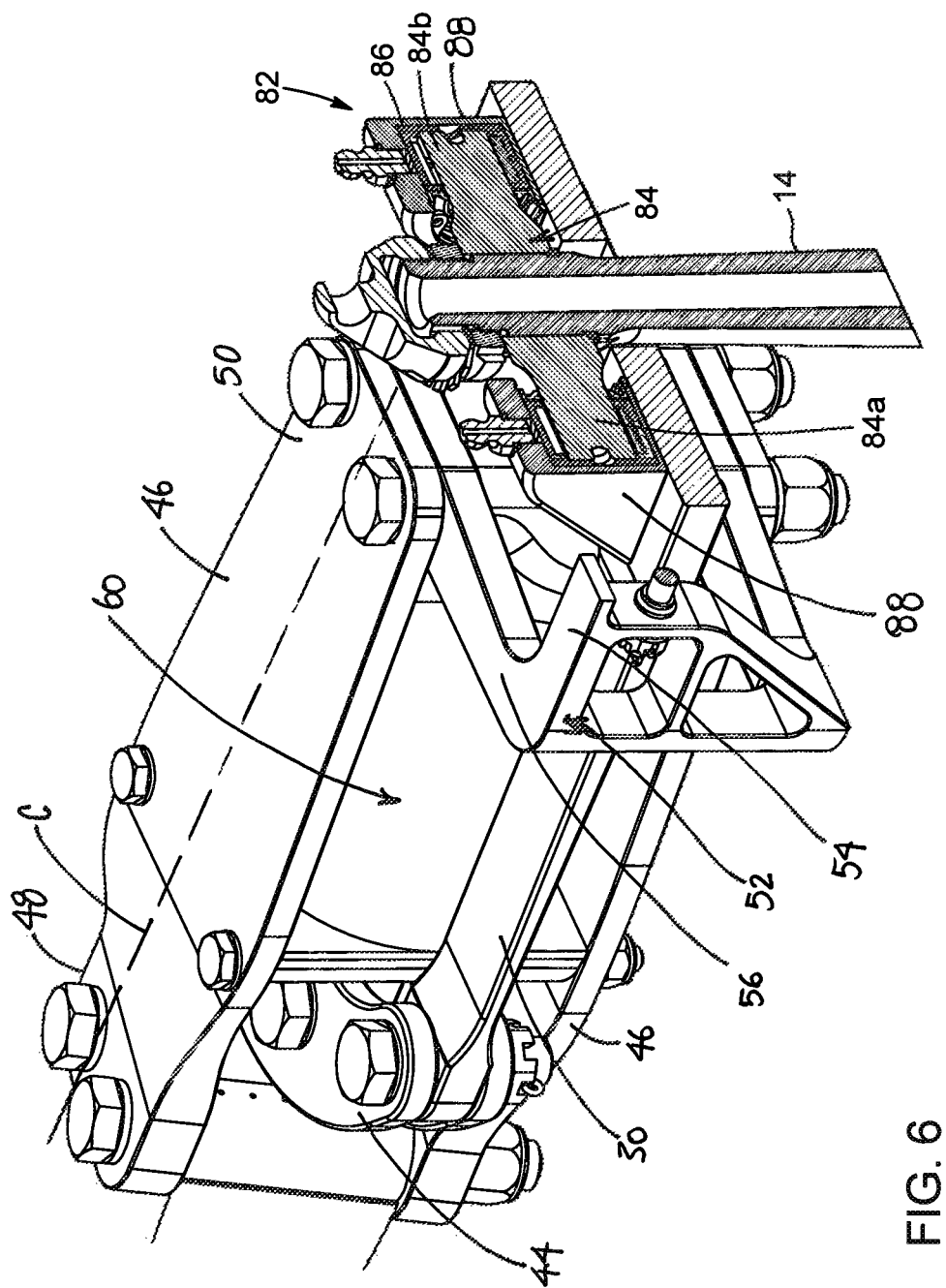
FIG. 6 is a cross-section view of the helicopter rotor hub assembly of FIG. 1, showing a mechanical connection between flap bearings and the helicopter mast.

In the embodiment shown, the helicopter rotor hub assembly 10 also includes a flap assembly 82. Rotation of the mast 14 about the mast axis M is transferred to a rotation of the yoke assembly 22 and the helicopter blades 16, through the flap assembly 82. Referring to FIG. 6, there is shown that the flap assembly 82 includes a central flap shaft 84 having two shaft sections 84a, 84b, each one extending on an opposed side of the mast 14. The two shaft sections 84a, 84b are secured to the mast 14 and rotate simultaneously therewith. The flap assembly 82 also includes a first set and a second set of flap bearings 86, each one being mounted to a respective one of the shaft sections 84a, 84b and surrounding same along a section thereof. More particularly, in the embodiment shown, the flap bearings 86 are mounted to and surround a distal section of each one of the shaft sections 84a, 84b. Each set of flap bearings 86 is contained in a flap bearing housing 88 having a lower portion secured to the yoke assembly 22 and, more particularly, to the central section 26 of the yoke assembly 22. In the embodiment shown, the flap bearing housings 88 are secured to the central section 26 with mechanical fasteners such as bolts. However, it is appreciated that the flap bearing housings 88 could be bonded to the yoke assembly 22, such as by welding, or be single-piece therewith. The assembly including the shaft 84, the flap bearings 86, and their flap bearing housings 88 extends along a transversal axis T, substantially orthogonal to both the mast axis M and the longitudinal axis L of the helicopter blades 16. Thus, the mast 14, through the shaft 84 and the flap bearing housings 88, engages the yoke assembly 22, the pitch assembly 24, and the helicopter blades 16 in rotation about the mast axis M. Since the engagement between the yoke assembly 22 and the mast 14 occurs through the flap bearings 86 mounted to the shaft 84, a see-saw movement of the rotor 12 along the transversal axis T is permitted.

Sometimes, for instance if no flapping hinge is provided in the rotor design, the deformation of the material of the blades 16 of the helicopter will produce flap or pitch. Under the lift force, the blades 16 will tend to move up or down and thus produce flapping. It is generally desirable to control the flap of the blades 16 by adding hinges closer to the rotor mast 14 in order to reduce control loads and to reduce vibrations transmitted from the rotor to the fuselage. According to the embodiment described above, the control of the flap movement of the helicopter blades 16 is first obtained by the flap bearings 86 mounted to the flap shaft 84, and secondly through the first and second sections 28, 30 of the yoke assembly 22 that have a flap section 40 along their length thinner than the thickness of the central section 26 of the yoke assembly 22.

The combined effect of the rotation speed of the helicopter blades 16 and their flapping movement result in high stresses towards the central section 26 of the yoke assembly 22. Therefore, it can be advantageous to have the central section 26 thicker than the elongated arms 34 in the flap sections 40. This specific geometry of the yoke assembly 22 described above allows a surface tension stress within, above and under the yoke assembly 22 to be substantially uniform.

The flap sections 40 of the first and second sections 28, 30 of the yoke assembly 22 provides a flexibility to the yoke assembly 22 and allow a flap movement to the blades 16, while the flap bearings 86 allow a see-saw movement of the rotor 12. For example, if a helicopter blade 16 moves in a flap movement of 1° and the other blade 16 moves by −0.8°, the flap bearings 86 will tilt the rotor hub assembly 10 of about 0.9° when the flap sections 40 of the first and second sections 28, 30 of the yoke assembly 22 provides a flexibility for the remaining 0.1°. In some cases, a yoke assembly 22 having a high flexibility from a particular design or the use of materials such as composites is sufficient for allowing a flapping movement, making the flap bearings 86 optional.

The flap sections 40 of the first and second sections 28, 30 of the yoke assembly 22 provides a flexibility to the yoke assembly 22 in order to also compensate the error between the fix pre-coning angle of the H-shaped plate 38 and the real coning angle affected by the actual weight of the helicopter, which weight varies during the flight. The helicopter weight variations may be caused by the fuel consumption. The coning angle is defined at the angle of the blade resulting by the vertical lift produced by one blade and the constant centrifugal load applied to this same blade.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A helicopter rotor hub assembly for coupling a pair of helicopter blades to a helicopter mast having a mast axis, each one of the helicopter blades having a proximal end and a distal end with a longitudinal axis extending inbetween, the rotor hub assembly comprising:
   a yoke assembly including:
      a central section having a mast-receiving aperture defined therein and extending along the mast axis; and
      a first section and a second section extending respectively on opposite sides of the central section, the first and second sections extending radially to the mast axis, each one of the first and second sections comprising a pair of spaced-apart elongated arms having a flap section, the spaced-apart elongated arms having a tapered profile along the flap section;
   wherein the central section has a central section thickness Tc greater than a thickness of the spaced-apart elongated arms in the flap section, the flap section of the spaced-apart elongated arms has a thickness varying between 0.2*Tc and 0.875*Tc along a length of the flap section, and a length of the flap section is longer than 4 times the central section thickness Tc.

2. The helicopter rotor hub assembly of claim 1, wherein the yoke assembly comprises:
   a yoke plate including the central section, the first section and the second section, and wherein the spaced-apart elongated arms of the respective one of the first and second sections define inbetween a bearing-receiving interspace; and
   a first set and a second set of yoke connecting plates mounted to the distal ends of a respective one of the spaced-apart elongated arms to close longitudinally the respective one of the bearing-receiving interspaces;
   wherein the helicopter rotor hub assembly comprises a pitch assembly comprising:
   a first set and a second set of attachment plates extending respectively along the first and second sections of the yoke assembly, each one of the first and second sets of attachment plates having a blade connecting end connectable to the proximal end of a respective one of the helicopter blades; and
   a first pitch bearing assembly and a second pitch bearing assembly, each including:
      a shaft extending in a respective one of the bearing-receiving interspace of the first and second sections of the yoke assembly and having a distal end secured to the yoke connecting plate of the respective one of the first and second sections; and
      pitch bearings rotatably mounted onto the shaft and abutting against the respective one of the first and second sets of attachment plates.

3. The helicopter rotor hub assembly of claim 2, wherein the yoke plate is V-shaped with the first and second sections of the yoke assembly extending upwardly from the central section and from a plane defined normally to the mast axis at an angle ranging between 0.5° and 4° with respect to the plane.

4. The helicopter rotor assembly of claim 2, wherein the central section of the yoke assembly defines a transversal axis, wherein each one of the first and second sets of attachment plates has a central longitudinal axis and each one of the first and second pitch bearing assemblies comprises a pitch connecting end offset along the transversal axis from the central longitudinal axis of a respective one of the first and second sets of attachment plates and operatively engageable to a respective pitch link extending along the mast axis, wherein the pitch connecting ends are aligned with the mast receiving aperture along the longitudinal axis and spaced-apart thereof along the transversal axis.

5. The helicopter rotor assembly of claim 2, wherein the first and second pitch bearing assemblies are spaced-apart from the spaced-apart elongated arms and the central section of the yoke assembly, wherein each one of the shafts of the first and second pitch bearing assemblies extends along a majority of a length of the bearing-receiving interspace, and has a proximal end located adjacent to but spaced-apart from the central section of the yoke assembly.

6. The helicopter rotor assembly of claim 2, wherein each one of the first and second sets of attachment plates partially encases a respective one of the first and second pitch bearing assemblies and delimits the respective one of the bearing-receiving interspaces.

7. The helicopter rotor hub assembly of claim 1, further comprising a flap assembly comprising a first set and second set of flap bearing assemblies mounted to the central section of the yoke assembly, and disposed along a transverse axis, orthogonal to both the mast axis and the longitudinal axis of the helicopter blades, each set of flap bearing assemblies having a shaft with a proximal end connected to the mast and rotating therewith about the mast axis.

8. The helicopter rotor hub assembly of claim 1, wherein each one of the spaced-apart elongated arms has a distal end section having a thickness equal to the central section thickness Tc of the central section.

9. A helicopter comprising the helicopter rotor hub assembly of claim 1.

10. A helicopter rotor hub assembly for coupling a pair of helicopter blades to a helicopter mast having a mast axis, each one of the helicopter blades having a proximal end and a distal end with a longitudinal axis extending inbetween, the rotor hub assembly comprising:
   a yoke assembly including:
      a central section having a mast-receiving aperture defined therein and extending along the mast axis;
      a first section and a second section extending respectively on opposite sides of the central section, the first and second sections extending radially to the mast axis, each one of the first and second sections comprising a pair of spaced-apart elongated arms having a flap section, the spaced-apart elongated arms having a tapered profile along the flap section;
      a yoke plate including the central section, the first section and the second section, and wherein the spaced-apart elongated arms of the respective one of the first and second sections define inbetween a bearing-receiving interspace; and
      a first set and a second set of yoke connecting plates mounted to the distal ends of a respective one of the spaced-apart elongated arms to close longitudinally the respective one of the bearing-receiving interspaces; and
   a pitch assembly comprising:
      a first set and a second set of attachment plates extending respectively along the first and second sections of the yoke assembly, each one of the first and second sets of attachment plates having a blade connecting end connectable to the proximal end of a respective one of the helicopter blades; and
      a first pitch bearing assembly and a second pitch bearing assembly, each including:
         a shaft extending in a respective one of the bearing-receiving interspace of the first and second sections of the yoke assembly and having a distal end secured to the yoke connecting plate of the respective one of the first and second sections; and
         pitch bearings rotatably mounted onto the shaft and abutting against the respective one of the first and second sets of attachment plates.

11. The helicopter rotor hub assembly of claim 10, wherein the yoke plate is V-shaped with the first and second sections of the yoke assembly extending upwardly from the central section and from a plane defined normally to the mast axis at an angle ranging between 0.5° and 4° with respect to the plane.

12. The helicopter rotor hub assembly of claim 10, further comprising a flap assembly comprising a first set and second set of flap bearing assemblies mounted to the central section of the yoke assembly, and disposed along a transverse axis, orthogonal to both the mast axis and the longitudinal axis of the helicopter blades, each set of flap bearing assemblies having a shaft with a proximal end connected to the mast and rotating therewith about the mast axis.

13. The helicopter rotor hub assembly of claim 10, wherein the central section has a central section thickness Tc greater than a thickness of the spaced-apart elongated arms in the flap section, the flap section of the spaced-apart elongated arms has a thickness varying between 0.2*Tc and 0.875*Tc along a length of the flap section, and a length of the flap section is longer than 4 times the central section thickness Tc.

14. The helicopter rotor assembly of claim 10, wherein the central section of the yoke assembly defines a transversal axis, wherein each one of the first and second sets of attachment plates has a central longitudinal axis and each one of the first and second pitch bearing assemblies comprises a pitch connecting end offset along the transversal axis from the central longitudinal axis of a respective one of the first and second sets of attachment plates and operatively engageable to a respective pitch link extending along the mast axis, wherein the pitch connecting ends are aligned with the mast receiving aperture along the longitudinal axis and spaced-apart thereof along the transversal axis.

15. The helicopter rotor assembly of claim 10, wherein the first and second pitch bearing assemblies are spaced-apart from the spaced-apart elongated arms and the central section of the yoke assembly.

16. The helicopter rotor assembly of claim 15, wherein each one of the shafts of the first and second pitch bearing assemblies extends along a majority of a length of the bearing-receiving interspace, and has a proximal end located adjacent to but spaced-apart from the central section of the yoke assembly.

17. The helicopter rotor assembly of claim 10, wherein each one of the first and second sets of attachment plates partially encases a respective one of the first and second pitch bearing assemblies and delimits the respective one of the bearing-receiving interspaces.

18. A helicopter rotor hub assembly for coupling a pair of helicopter blades to a helicopter mast having a mast axis, each one of the helicopter blades having a proximal end and a distal end with a longitudinal axis extending inbetween, the rotor hub assembly comprising:

a yoke assembly including:

a central section having a mast-receiving aperture defined therein and extending along the mast axis; and a first section and a second section extending respectively on opposite sides of the central section, the first and second sections extending radially to the mast axis, each one of the first and second sections comprising a pair of spaced-apart elongated arms having a flap section, the spaced-apart elongated arms having a tapered profile along the flap section;

a flap assembly comprising a first set and second set of flap bearing assemblies mounted to the central section of the yoke assembly, and disposed along a transverse axis, orthogonal to both the mast axis and the longitudinal axis of the helicopter blades, each set of flap bearing assemblies having a shaft with a proximal end connected to the mast and rotating therewith about the mast axis.

19. The helicopter rotor hub assembly of claim 18, wherein the central section has a central section thickness Tc greater than a thickness of the spaced-apart elongated arms in the flap section, the flap section of the spaced-apart elongated arms has a thickness varying between 0.2*Tc and 0.875*Tc along a length of the flap section, and a length of the flap section is longer than 4 times the central section thickness Tc.

20. The helicopter rotor hub assembly of claim 18, wherein the yoke assembly comprises:

a yoke plate including the central section, the first section and the second section, and wherein the spaced-apart elongated arms of the respective one of the first and second sections define inbetween a bearing-receiving interspace; and a first set and a second set of yoke connecting plates mounted to the distal ends of a respective one of the spaced-apart elongated arms to close longitudinally the respective one of the bearing-receiving interspaces;

the helicopter rotor hub assembly comprising a pitch assembly comprising:

a first set and a second set of attachment plates extending respectively along the first and second sections of the yoke assembly, each one of the first and second sets of attachment plates having a blade connecting end connectable to the proximal end of a respective one of the helicopter blades; and a first pitch bearing assembly and a second pitch bearing assembly, each including:

a shaft extending in a respective one of the bearing-receiving interspace of the first and second sections of the yoke assembly and having a distal end secured to the yoke connecting plate of the respective one of the first and second sections; and pitch bearings rotatably mounted onto the shaft and abutting against the respective one of the first and second sets of attachment plates.

21. The helicopter rotor hub assembly of claim 18, wherein each one of the spaced-apart elongated arms has a distal end section having a thickness equal to a central section thickness Tc of the central section.

* * * * *